United States Patent
Wolf

(10) Patent No.: US 7,400,289 B1
(45) Date of Patent: Jul. 15, 2008

(54) PLUME-TO-HARDBODY OFFSET COMPENSATION IN BOOSTING MISSILES

(75) Inventor: David E. Wolf, Holland, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/527,976

(22) Filed: Sep. 27, 2006

(51) Int. Cl.
- *G01S 13/88* (2006.01)
- *F41G 7/30* (2006.01)
- *F41G 9/00* (2006.01)
- *F41G 7/00* (2006.01)
- *G01S 13/00* (2006.01)

(52) U.S. Cl. .......................... 342/62; 89/1.11; 244/3.1; 244/3.11; 244/3.14; 342/52; 342/53; 342/61; 342/67; 342/175; 342/195

(58) Field of Classification Search ........... 244/3.1–3.3; 342/52–68, 89, 90, 118, 175, 195; 89/1.11
See application file for complete search history.

(56) References Cited

U.S. PATENT DOCUMENTS

| | | | | |
|---|---|---|---|---|
| 2,842,760 A * | 7/1958 | McLucas | ...................... | 342/53 |
| 3,010,102 A * | 11/1961 | Ketchledge et al. | ........... | 342/53 |
| 3,076,961 A * | 2/1963 | Bibbero | ........................ | 342/53 |
| 3,108,270 A * | 10/1963 | Fairbanks | ...................... | 342/53 |
| 3,169,726 A * | 2/1965 | Jackson | ...................... | 244/3.14 |
| 3,242,485 A * | 3/1966 | Astheimer | ..................... | 342/53 |
| 3,320,420 A * | 5/1967 | Paglee et al. | ................... | 342/53 |
| 3,902,172 A * | 8/1975 | Weiss et al. | .................... | 342/53 |
| 4,317,117 A * | 2/1982 | Chasek | ......................... | 342/53 |
| 4,905,292 A * | 2/1990 | Wentworth et al. | ........... | 342/53 |
| 5,122,801 A * | 6/1992 | Hughes | ......................... | 342/59 |
| 5,296,860 A * | 3/1994 | Li | ................................ | 342/58 |
| 5,308,984 A * | 5/1994 | Slawsby et al. | ................ | 342/53 |
| 5,341,142 A * | 8/1994 | Reis et al. | ...................... | 342/64 |
| 5,365,236 A * | 11/1994 | Fagarasan et al. | ............. | 342/53 |
| 5,952,957 A * | 9/1999 | Szu | ............................... | 342/53 |
| RE36,944 E * | 11/2000 | Li | ................................ | 342/58 |
| 6,333,986 B1 * | 12/2001 | Petty | ............................ | 342/53 |
| 6,720,907 B1 * | 4/2004 | Miron | .......................... | 342/52 |
| 6,771,208 B2 * | 8/2004 | Lutter et al. | ................... | 342/52 |
| 7,129,887 B2 * | 10/2006 | Mitchell | ....................... | 342/53 |
| 7,183,966 B1 * | 2/2007 | Schramek et al. | ............. | 342/53 |
| 7,190,304 B1 * | 3/2007 | Carlson | ........................ | 342/62 |
| 2004/0056792 A1* | 3/2004 | Miron | .......................... | 342/52 |
| 2004/0061641 A1* | 4/2004 | Fischer | ........................ | 342/53 |

* cited by examiner

*Primary Examiner*—Bernarr E Gregory
(74) *Attorney, Agent, or Firm*—Duane Morris LLP

(57) ABSTRACT

A methodology determines the offset distance between a threat missile plume and its hardbody during boost phase to aid in guiding a kinetic weapon (KW) or interceptor missile to the threat missile hardbody using the KW infrared sensor of the interceptor missile in conjunction with a radar sensor.

4 Claims, 2 Drawing Sheets

10

PLUME-TO-HARDBODY OFFSET COMPENSATION IN BOOSTING MISSILES

FIELD OF THE INVENTION

This invention relates to directing antimissile weapons against threat missiles in their boost stage, and more particularly to methods for compensation for the difference between the location of the plume relative to the hardbody of the threat missile.

BACKGROUND OF THE INVENTION

Antimissile efforts may use directed-beam weapons, in which the future target missile or target location is not of particular interest, as the speed of the beam is so great that the missile motion is irrelevant. In those cases in which antimissile interceptors with explosive warheads are used, the interceptor speed is of the same order as that of the target missile, and the estimated future location of the target missile is of great importance. The estimated future location of the target missile can be determined by the use of radar. A great deal of effort has been put into antimissile interceptor guidance schemes which predict the future location of the target missile, the interceptor missile, or both, so as to attempt to cause the interceptor to get within a given range of the target missile such that the explosive warhead destroys the target missile. These guidance systems require measurements of the target missile so as to determine its current location, and also require estimates of its projected trajectory.

It is known that rocket engine or rocket motor plumes are hot, and radiate energy across the entire electromagnetic spectrum, including the infrared (IR) portion of the spectrum. The radiated energy constitutes a signature which may allow the rocket engine to be identified or characterized. Different missile systems using either liquid or solid propellant display different infrared (IR) signatures at various altitudes, mach numbers, and aspect angles. These IR signatures have been used for many years to warn of Intercontinental Ballistic Missile (ICBM) launches or to characterize tactical threat systems.

Kinetic weapons (KW) are known for use against threat missiles. Such weapons do not use an explosive charge for destroying the threat missile, but rather rely upon the kinetic energy of a moving object impacting on the hard body of the threat missile. Such schemes have been tested and can be effective. Some antimissile weapons use infrared (IR) schemes for terminal guidance, so as to result in the desired impact between the antimissile weapon and the missile to be destroyed. One of the problems associated with the use of infrared guidance of a kinetic weapon against a boosting missile lies in the inability of the kinetic weapon's infrared seeker to accurately determine the location of the hard body of the target missile in the presence of a hot IR plume from the boost engine.

A proposed solution to the problem of inability of the infrared seeker to distinguish between the hard body of the target missile and the hot plume lies in the use of multiple IR sensors, which respond to different portions of the IR signature, and can distinguish between the hard body and the plume. This solution may be effective, but requires that two or more IR seekers with different characteristics be used. Terminal guidance of a kinetic weapon is facilitated when the sensing and the signal processing are performed on-board the kinetic weapon so as to avoid delays associated with ground-based detection and processing, and data transmission delays. On-board IR sensing with different signatures requires that the kinetic weapon carry two or more different IR sensors, which undesirably adds weight, complexity, and cost to the weapon.

SUMMARY OF THE INVENTION

A method according to an aspect of the invention is for directing a weapon toward a boosting missile. The method comprises the steps of sensing the boosting missile with an infrared sensor to thereby generate an infrared signature representing the boosting missile, and determining from the infrared signature the infrared centroid. The boosting missile is illuminated with a radar to thereby generate a radar cross-section representing the boosting missile. From the radar cross-section representing the boosting missile, the radar cross-section of the hardbody and of the plume of the boosting missile are determined. From the radar cross-sections of the hardbody and plume, the radar cross-section centroids of the hardbody and plume are determined. The centroids are processed to determine the location of the hardbody relative to the infrared centroid in the plume. A particularly advantageous mode of the method further comprises the step of directing the weapon toward a location offset from the infrared centroid by the difference between the location of the hardbody relative to the infrared centroid.

In another version of this method, the step of processing the centroids to determine the location of the hardbody relative to the infrared centroid comprises the steps of determining a line representing the boosting missile velocity vector. The difference is taken between the location of the infrared centroid and the location of the plume radar cross-section centroid to establish a first difference vector. The difference is taken between the location of the plume radar cross-section centroid and the location of the hardbody radar cross-section centroid to form a second difference vector. The first and second difference vectors are vector summed to establish the offset vector between the location of the hardbody radar cross-section centroid and the location of the infrared centroid.

DESCRIPTION OF THE INVENTION

Figure 1:
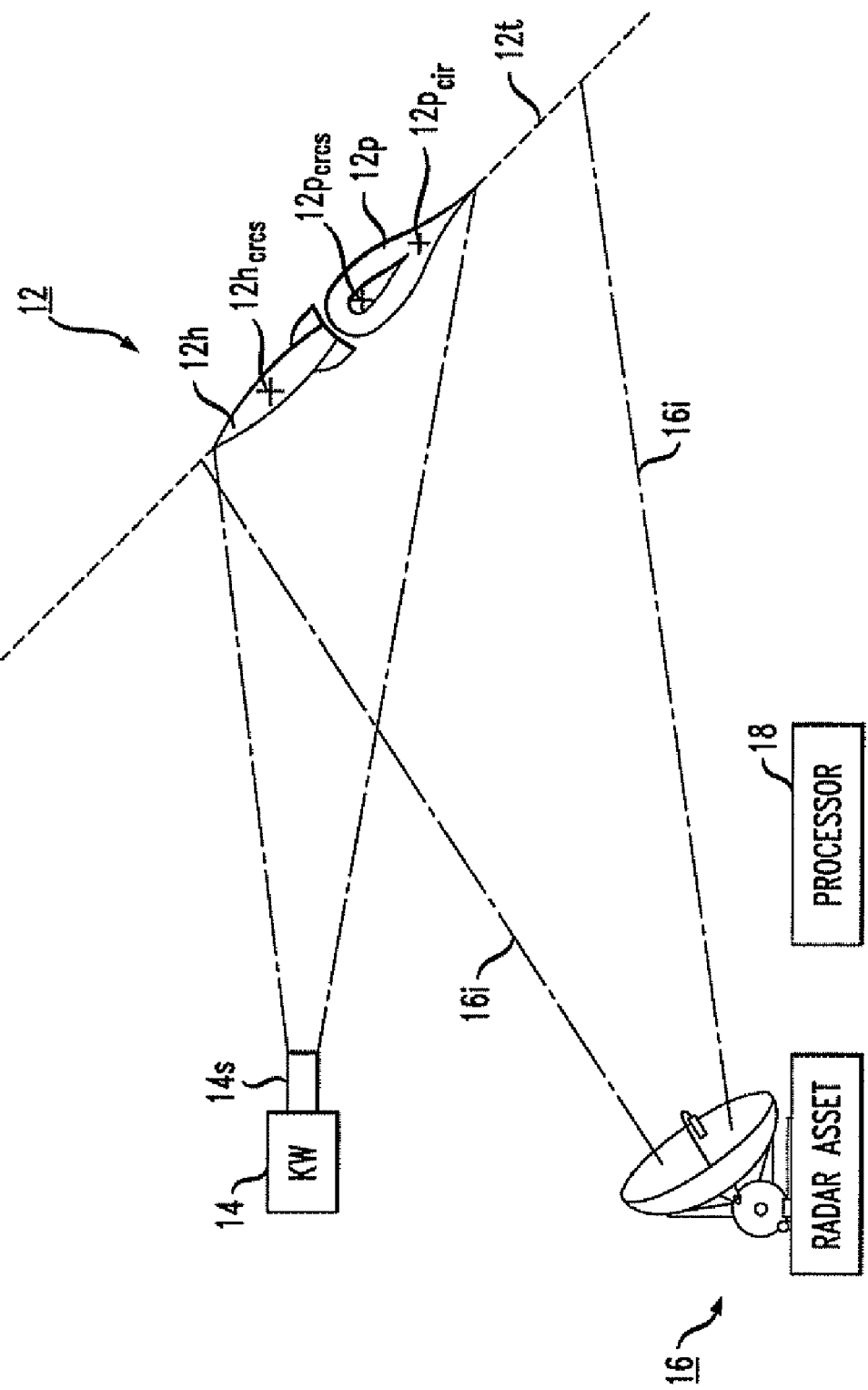
FIG. 1 is a simplified representation of a scenario in which a boosting threat missile is observed by the IR seeker of a kinetic weapon and by a radar system.

In the scenario 10 of FIG. 1, a threat missile 12 includes a hard body 12h. The missile 12 is boosting, so it produces a plume 12p of hot gas coaxial with its instantaneous trajectory 12t. A weapon 14, which may be a kinetic weapon, includes an infrared seeker 14s which senses the boosting missile 12. The sensor 14s will respond most strongly to the plume 12p of the boosting missile 12. Due to the infrared contrast between the relatively cool hard body 12h and the hot plume 12p of the threat missile 12, infrared seeker 14s may not even perceive the existence of the hard body 12h. A radar system designated generally as 16 illuminates the threat missile 12, including its hardbody 12h and its plume 12p. The radar cross-section of the radar return to the radar system 16 from the target missile 12 may include a component attributable to the hard body 12h and another component attributable to the plume 12p.

The sensor of the IR seeker 14s of FIG. 1 will generate a signal representing the IR signature of the plume at the frequencies to which the IR sensor responds. The IR signature of the plume is processed in known fashion to obtain the plume infrared centroid. The location of the plume infrared centroid is illustrated as $12p_{cir}$ in FIG. 1. Those skilled in the art know that the plume infrared centroid can be obtained by the general method of calculating any distributed property centroid, as indicated, for example, in the text *Vector Mechanics* by Beer and Johnston.

Figure 3:
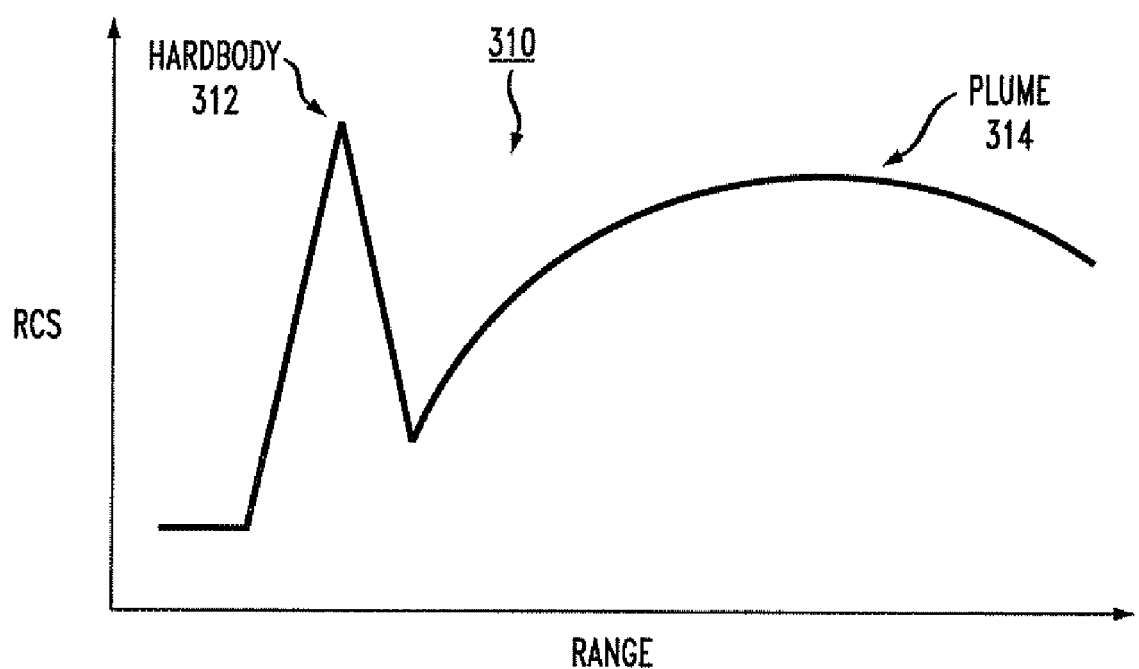
FIG. 3 is a representation of the radar cross-section (RCS) return obtained by a radar for the hardbody and plume of a boosting target missile.

Illumination of the boosting threat missile 12 of FIG. 1 by radar 16 results in a reflected signal which represents the radar cross-section (RCS) of the missile hardbody 12h and plume 12p. Plot 310 of FIG. 3 represents one possible reflected signal plotted as a function of range. Plot 310 includes a peaked or spiked portion 312 which represents the hardbody 12h of the target missile, and also includes a broad peak region 314 which represents the plume 12p. The RCS thus includes components arising from the hardbody 12h and the plume 12p. These components are separable, as known in the art. The separation of RCS components is performed by examining the RCS return, determining the sharp spiked portion of the return is the hardbody component and the extended peak region is the plume component. The RCS components from both the hardbody and the plume are processed to obtain their RCS centroids as described above. Thus, processing of the RCS information returned from the boosting threat missile hardbody 12h and the plume 12p, which may be performed in a processor (Proc) illustrated as a block 18, separately determines the instantaneous locations of the RCS centroid $12h_{crcs}$ of the hardbody 12h and the RCS centroid $12p_{crcs}$ of the plume, which in general is at a different location than the infrared centroid $12p_{cir}$. While processor 18 is illustrated as being separated from kinetic weapon 14 and radar system 16, the processing may be performed at any location, including at the site of the radar system 16, on-board the kinetic weapon 14, elsewhere, or it may be distributed among any or all of these locations. If the radar system 16 is ground-based and the processing is on-board the kinetic weapon 14, some means, such as a transmission path, must be provided for making the radar information available to the processor in the kinetic weapon 14. The need for such a data transmission path can be obviated by placing the radar system on-board the kinetic weapon.

Figure 2:
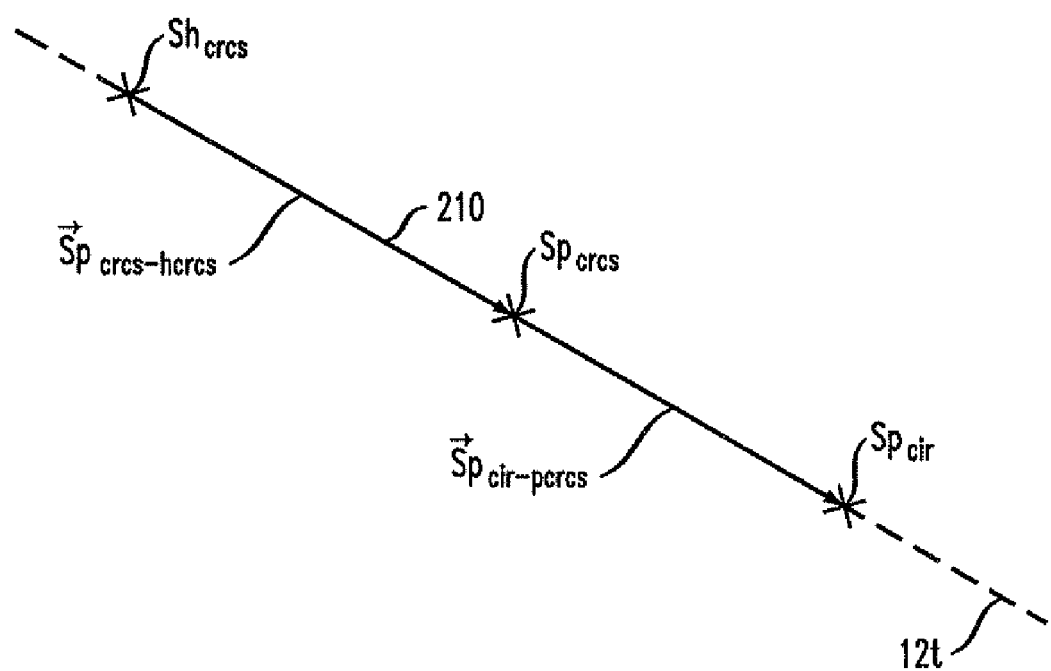
FIG. 2 is a representation of the locations along the instantaneous trajectory vector of the infrared centroid of the plume, the radar cross-section centroid of the plume, the radar cross-section centroid of the hardbody and the defined difference vectors.

Regardless of the location of the processor(s) which perform the calculations, simple calculations are used to determine the offset to be applied to the location of the hardbody 12h of the threat missile 12 relative to the infrared centroid $12p_{cir}$. FIG. 2 illustrates the relevant geometry. In FIG. 2, distance along the instantaneous trajectory or path 12t of the threat missile is denominated S. Thus, $Sh_{crcs}$ is a location on the hardbody as indicated by the centroid of the radar cross-section of the hardbody. At some distance behind (in the direction of motion of the threat missile) the RCS centroid hardbody location $Sh_{crcs}$ is the location $Sp_{crcs}$ of the RCS centroid of the plume 12p, both as determined by the radar cross-section. The vector representing this distance is denominated $\overline{S}_{pcrcs-hcrcs}$. Similarly, the vector representing the distance between the location of plume RCS centroid $Sp_{crcs}$ and the location of infrared plume centroid $Sp_{cir}$ is given as $\overline{S}_{pcir-pcrcs}$.

The various centroid locations are in practice changing during many sequential measurements, so that at any time they are calculated as $$Sh_{crcs} = \Sigma(rcs_i S_i)_h / RCS_h$$

$$Sp_{crcs} = \Sigma(rcs_i S_i)_p / RCS_p$$

$$Sp_{cir} = \Sigma(ir_i S_i)_p / IR_p$$

where:
$(rcs_i S_i)_h$ is the local value of RCS for the hardbody times its distance along S;
$(rcs_i S_i)_p$ is the local value of RCS for the plume times its distance along S;
$(ir_i S_i)_p$ is the local value of IR for the plume times its distance along S;
$RCS_h$ is the total hardbody RCS return;
$RCS_p$ is the total plume RCS return; and
$IR_p$ is the total plume IR return.

The kinetic weapon 14 of FIG. 1 sees the threat missile 12 by means of its infrared sensor as being located at the instant of the measurement at the IR centroid of the plume, $Sp_{cir}$. The offset distance between the threat missile as seen by the IR sensor at $Sp_{cir}$ and the actual location of the hardbody 12h is defined by the vector equation $$\overline{S}_{hcrcs-pcir} = -(\overline{S}_{pcrcs-hcrcs} + \overline{S}_{pcir-pcrcs})$$

This calculation is performed repeatedly during tracking to update the information, and the kinetic weapon is directed toward a location offset by $\overline{S}_{hcrcs-pcir}$ in the direction of motion along track 12t from the apparent location of the missile $Sp_{cir}$ as indicated by the IR seeker 14s.

An advantage of the described system is that the kinetic weapon can use a conventional single IR sensor, and the information is supplemented by information from a radar system, which is often available in situations in which a kinetic weapon is used. The supplemental information identifies the offset which must be applied to the apparent location of the target missile as indicated by the IR sensor in order to hit the hard body. This avoids the need for multiple IR sensors aboard the kinetic weapon.

A method according to an aspect of the invention is for directing a weapon (14) toward a boosting missile (12). The method comprises the steps of sensing the boosting missile with an infrared sensor (14s) to thereby generate an infrared signature representing the boosting missile, and determining the infrared centroid ($12p_{cir}$), as known in the art. The boosting missile is illuminated with a radar (16i) to thereby generate a radar cross-section representing the boosting missile (12). From the radar cross-section representing the boosting missile, and determining centroid of the radar cross-section ($12h_{crcs}$; $12p_{crcs}$) of the hardbody (12h) and of the plume (12p) of the boosting missile (12) are determined as in the prior art. The centroids ($12h_{crcs}$; $12p_{crcs}$; $12p_{cir}$) are processed to determine the location $\overline{S}_{hcrcs-pcir}$ of the hardbody relative to the plume infrared centroid $Sp_{cir}$. A particularly advantageous mode of the method further comprises the step of directing the weapon toward a location offset from the infrared centroid by the difference $-(\overline{S}_{pcrcs-hcrcs} + \overline{S}_{pcir-pcrcs})$ between the location $\overline{S}_{hcrcs-pcir}$ of the hardbody (12h) relative to the infrared centroid $12p_{cir}$.

In another version of this method, the step of processing the centroids ($12h_{crcs}$; $12p_{crcs}$; $12p_{cir}$) to determine the location of the hardbody $\overline{S}_{hcrcs-pcir}$ relative to the infrared centroid $12p_{cir}$ comprises the steps of determining a line (210) representing the boosting missile (12) velocity vector. The difference is taken between the location $Sp_{cir}$ of the infrared centroid and the location of the plume radar cross-section centroid $Sp_{crcs}$ to establish a first difference vector $\overline{S}_{pcir-pcrcs}$. The difference is taken between the location of the plume radar cross-section centroid and the location of the hardbody radar cross-section centroid to form a second difference vector $\overline{S}_{pcrcs-hcrcs}$. The first and second difference vectors are vector summed–$(\overline{S}_{pcrcs-hcrcs}+\overline{S}_{pcir-pcrcs})$ to establish the offset vector $\overline{S}_{hcrcs-pcir}$ between the location $Sh_{crcs}$ of the hardbody radar cross-section centroid and the location $Sp_{cir}$ of the infrared centroid.

What is claimed is:

1. A method for directing a weapon toward a boosting missile, said method comprising the steps of:
    sensing said boosting missile with an infrared sensor to thereby generate an infrared signature representing the boosting missile, said boosting missile having a hardbody;
    determining from said infrared signature the infrared centroid;
    illuminating said boosting missile with a radar system to thereby generate a radar cross-section representing the boosting missile;
    determining from said radar cross-section the radar cross-section of the hardbody of said boosting missile and the radar cross-section of the plume of said boosting missile;
    determining from said radar cross-section of the hardbody and the radar cross-section of the plume the radar cross-section centroids of each;
    processing said centroids to determine the location of said hardbody relative to said infrared centroid; and
    directing said weapon toward said hardbody of said boosting missile based on the location of said hardbody relative to said infrared centroid and said radar cross-section centroids.

2. A method according to claim 1, wherein said method further comprises the step of directing said weapon toward a location offset from said infrared centroid by the difference between said location of said hardbody relative to said location of said infrared centroid.

3. A method according to claim 1, comprising the initial step of mounting said infrared sensor on said weapon.

4. A method according to claim 1, wherein said step of processing said centroids to determine the location of said hardbody relative to said infrared centroid comprises the steps of:
    determining a line representing the boosting missile velocity vector;
    taking the difference between the location of said plume infrared centroid and the location of said plume radar cross-section centroid to establish a first difference vector;
    taking the difference between the location of said plume radar cross-section centroid and the location of said hardbody radar cross-section centroid to form a second difference vector; and
    vector summing said first and second difference vectors to establish the offset vector between the location of said hardbody radar cross-section centroid and the location of said plume infrared centroid.

* * * * *

UNITED STATES PATENT AND TRADEMARK OFFICE
CERTIFICATE OF CORRECTION

PATENT NO. : 7,400,289 B1
APPLICATION NO. : 11/527976
DATED : July 15, 2008
INVENTOR(S) : David E. Wolf It is certified that error appears in the above-identified patent and that said Letters Patent is hereby corrected as shown below:

In column 1, beginning on line 3 directly below the title and above the section heading "Field of Invention", please insert the following:

--STATEMENT OF GOVERNMENTAL INTEREST

This invention was made with Government support under contract N00024-03-C-6110 of the Aegis BMD - ESD Program. The United States Government has certain rights in this invention.--

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,400,289 B1 | Page 1 of 1 |
| APPLICATION NO. | : 11/527976 | |
| DATED | : July 15, 2008 | |
| INVENTOR(S) | : David E. Wolf | |

It is certified that error appears in the above-identified patent and that said Letters Patent is hereby corrected as shown below:

In Column 1, line 3 please insert the following:

-- GOVERNMENTAL INTEREST

This invention was made with Government support under Contract N00024-03-C-6110 awarded by the Department of the Navy. The Government has certain rights in this invention. --

Signed and Sealed this
Seventeenth Day of July, 2012

David J. Kappos
*Director of the United States Patent and Trademark Office*